(12) United States Patent
Inao et al.

(10) Patent No.: US 9,340,170 B2
(45) Date of Patent: May 17, 2016

(54) WIRE HARNESS EXTERIOR MEMBER AND WIRE HARNESS

(71) Applicant: Yazaki Corporation, Tokyo (JP)

(72) Inventors: Shinichi Inao, Makinohara (JP);
Hideomi Adachi, Makinohara (JP);
Takeshi Ogue, Makinohara (JP);
Tatsuya Oga, Makinohara (JP);
Masaaki Suguro, Makinohara (JP);
Yoshiaki Ozaki, Makinohara (JP);
Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/606,656

(22) Filed: Jan. 27, 2015

(65) Prior Publication Data

US 2015/0136483 A1 May 21, 2015

Related U.S. Application Data

(63) Continuation of application No. PCT/JP2013/071861, filed on Aug. 13, 2013.

(30) Foreign Application Priority Data

Aug. 20, 2012 (JP) ................................. 2012-181599

(51) Int. Cl.
*H02G 3/04* (2006.01)
*B60R 16/02* (2006.01)
*H01B 7/282* (2006.01)

(52) U.S. Cl.
CPC .......... *B60R 16/0215* (2013.01); *H01B 7/2825* (2013.01); *H02G 3/0418* (2013.01); *H02G 3/0481* (2013.01); *H02G 3/0468* (2013.01)

(58) Field of Classification Search
CPC .................. B60R 16/0207; B60R 16/0215
USPC ........................................................ 174/72 A
See application file for complete search history.

(56) References Cited

U.S. PATENT DOCUMENTS

| | | | | |
|---|---|---|---|---|
| 6,051,789 A * | 4/2000 | Kato | ................... | B29C 47/0023 138/121 |
| 2004/0107533 A1 | 6/2004 | Nishihara et al. | | |
| 2010/0043225 A1* | 2/2010 | Oga | ..................... | B60R 16/0207 29/857 |
| 2011/0067920 A1* | 3/2011 | Toyama | .............. | B60R 16/0207 174/72 A |

(Continued)

FOREIGN PATENT DOCUMENTS

| | | |
|---|---|---|
| EP | 2298608 A1 | 3/2011 |
| JP | 2004-187426 A | 7/2004 |

(Continued)

OTHER PUBLICATIONS

Written Opinion dated Sep. 17, 2013 issued in International Application No. PCT/JP2013/071861 (PCT/ISA/237).

(Continued)

*Primary Examiner* — Sherman Ng
(74) *Attorney, Agent, or Firm* — Sughrue Mion, PLLC

(57) ABSTRACT

A wire harness exterior member has a plurality of specified sections set along a tubular body longitudinal direction of a body portion, and the body portion has, for each specified section, a resin characterized portion molded using a resin material having characteristics adapted to the corresponding specified section.

6 Claims, 6 Drawing Sheets

(56) References Cited

U.S. PATENT DOCUMENTS

2011/0088944 A1 4/2011 Ogue et al.
2011/0094796 A1* 4/2011 Toyama .............. B60R 16/0207
174/72 A

FOREIGN PATENT DOCUMENTS

| JP | 2007-185067 A | 7/2007 |
| JP | 2009-143326 A | 7/2009 |
| JP | 2010-012868 A | 1/2010 |

OTHER PUBLICATIONS

Search Report dated Sep. 17, 2013, issued by the International Searching Authority in counterpart International Application No. PCT/JP2013/071861.
Written Opinion dated Sep. 17, 2013, issued by the International Searching Authority in counterpart International Application No. PCT/JP2013/071861.
Supplementary European Search Report issued on Mar. 4, 2016, by the European Patent Office in counterpart European Application No. 13831387.9.

* cited by examiner

WIRE HARNESS EXTERIOR MEMBER AND WIRE HARNESS

CROSS REFERENCE TO RELATED APPLICATIONS

This application is a continuation of International Patent Application No. PCT/JP2013/071861 filed on Aug. 13, 2013, claiming priority from Japanese Patent Application No. 2012-181599 filed on Aug. 20, 2012, the contents of which are incorporated herein by reference.

FIELD OF INVENTION

The present invention relates to a wire harness exterior member and a wire harness including this exterior member.

BACKGROUND ART

High-voltage (i.e., for high voltage) wire harnesses are used as components for electrical connection between, for example, a battery and an inverter unit of a hybrid car or an electric car. Some wire harnesses for the electrical connection between the battery and the inverter unit include a plurality of high-voltage conducting paths and an exterior member for protecting these conducting paths (see Patent Document 1 identified below).

Patent Document 1: JP 2010-12868 A

In the above-mentioned prior art, an exterior member made of resin is used. The arranging location of the wire harness for use in a hybrid car or an electric car generally includes a vehicle underfloor portion. Hence, the exterior member of the wire harness may be exposed to external environment. Furthermore, the exterior member may be partially exposed to the heat of heating elements, such as an exhaust pipe and an exhaust manifold. For this reason, an expensive resin material having all of chemical resistance, abrasion resistance, heat resistance, etc. is used for conventional exterior members in some cases. In such cases, the costs for the exterior member and the wire harness increase.

In addition, in a case where the exterior member is partially exposed to heat, heat resistance is required only at some portions of the exterior member. However, since the same expensive resin material is used for the entire exterior member according to the prior art, the entire exterior member has heat resistance. As a result, portions not requiring heat resistance have heat resistance. As described above, in the exterior member according to the prior art, the characteristics of resin materials may not be fully utilized at the respective portions of the exterior member.

The present invention has been made in view of the above circumstances, and it is an object thereof to provide a wire harness exterior member and a wire harness capable of reducing cost and capable of utilizing the characteristics of resin materials at the respective portions thereof.

SUMMARY OF INVENTION

To solve the problem described above, the wire harness exterior member and the wire harness according to the present invention have the following features (1) to (6).

(1) A wire harness exterior member made of resin, the wire harness exterior member having a tubular body portion covering at least one conducting path, at least a portion of the body portion in a tubular body longitudinal direction of the body portion being arranged at a vehicle underfloor portion, in which a plurality of specified sections are set along the tubular body longitudinal direction of the body portion, and the body portion has, for each specified section, a resin characterized portion molded using a resin material having characteristics adapted to the corresponding specified section.

(2) The wire harness exterior member according to (1) described above, in which adjacent ones of the resin characterized portions are provided continuously in a watertight manner.

(3) The wire harness exterior member according to (1) or (2) described above, in which the body portion includes a flexible tube portion molded as a flexible portion and an inflexible tube portion molded as an inflexible portion continuing from the flexible tube portion, and in which the resin characterized portions are provided in the inflexible tube portion, or in the flexible tube portion and in the inflexible tube portion.

(4) The wire harness exterior member according to (1) or (2) described above, in which the body portion is configured as a corrugated tube portion or a non-corrugated tube portion.

(5) The wire harness exterior member according to (1) or (2) described above, in which the body portion is configured as a combination of a corrugated tube portion and a non-corrugated tube portion, and in which the resin characterized portions are provided in the non-corrugated tube portion, or in the corrugated tube portion and in the non-corrugated tube portion.

(6) A wire harness including a wire harness exterior member according to any one of (1) to (5) described above and at least one conducting path covered by the wire harness exterior member.

In the wire harness exterior member according to (1) described above, a plurality of sections are set along the tubular body longitudinal direction, and a plurality of resin characterized portions are molded using the resin materials having characteristics adapted to the respective specified sections. For this reason, the wire harness exterior member meeting requirements can be provided instead of molding the whole using an expensive resin material having numerous characteristics, whereby the cost can be reduced in comparison with conventional external members. Furthermore, with the wire harness exterior member according to (1) described above, since the wire harness exterior member has the plurality of resin characterized portions, the exterior member can utilize the characteristics of the resin materials at the respective portions thereof.

With the wire harness exterior member according to (2) described above, since the adjacent ones of the resin characterized portions are provided continuously in a watertight manner, moisture, chemicals, etc. are prevented from intruding from the connection portions of the resin characterized portions. Hence, in the case that the wire harness is configured using the wire harness exterior member, the influence of moisture, chemicals, etc. existing outside the exterior member to the conducting paths covered by the wire harness exterior member can be reduced.

With the wire harness exterior member according to (3) described above, it is possible to provide a wire harness exterior member including the flexible tube portion that is molded as a flexible portion and the inflexible tube portion that is molded as an inflexible portion.

With the wire harness exterior member according to (4) described above, it is possible to provide a wire harness exterior member that is formed of either one of the corrugated tube portion and the non-corrugated tube portion.

With the wire harness exterior member according to (5) described above, it is possible to provide a wire harness exterior member having a combination of the corrugated tube portions and the non-corrugated tube portions.

With the wire harness exterior member according to (6) described above, since the wire harness includes the exterior member according to any one of (1) to (5) described above, cost reduction can be attained. Furthermore, with the wire harness according to (6) described above, since required characteristics (that is, chemical resistance, abrasion resistance, heat resistance, etc.) can be given to the respective portions of the wire harness exterior member, it is possible to provide a better wire harness.

EMBODIMENTS OF INVENTION

A wire harness according to this embodiment includes at least one conducting path and an exterior member for covering this conducting path. The exterior member is molded using a plurality of resin materials so that the characteristics of the resin materials are utilized at the respective portions thereof.

More specifically, for example, the exterior member is molded so that a portion that is molded using a resin material having chemical resistance, a portion that is molded using a resin material having chemical resistance and flame retardance and a portion that is molded using a resin material having abrasion resistance are made to be continued.

Furthermore, for example, a portion that is molded using a resin material capable of providing flexibility and a portion that is molded using a resin material capable of providing rigidity are made to be continued.

First Embodiment

Figure 1:
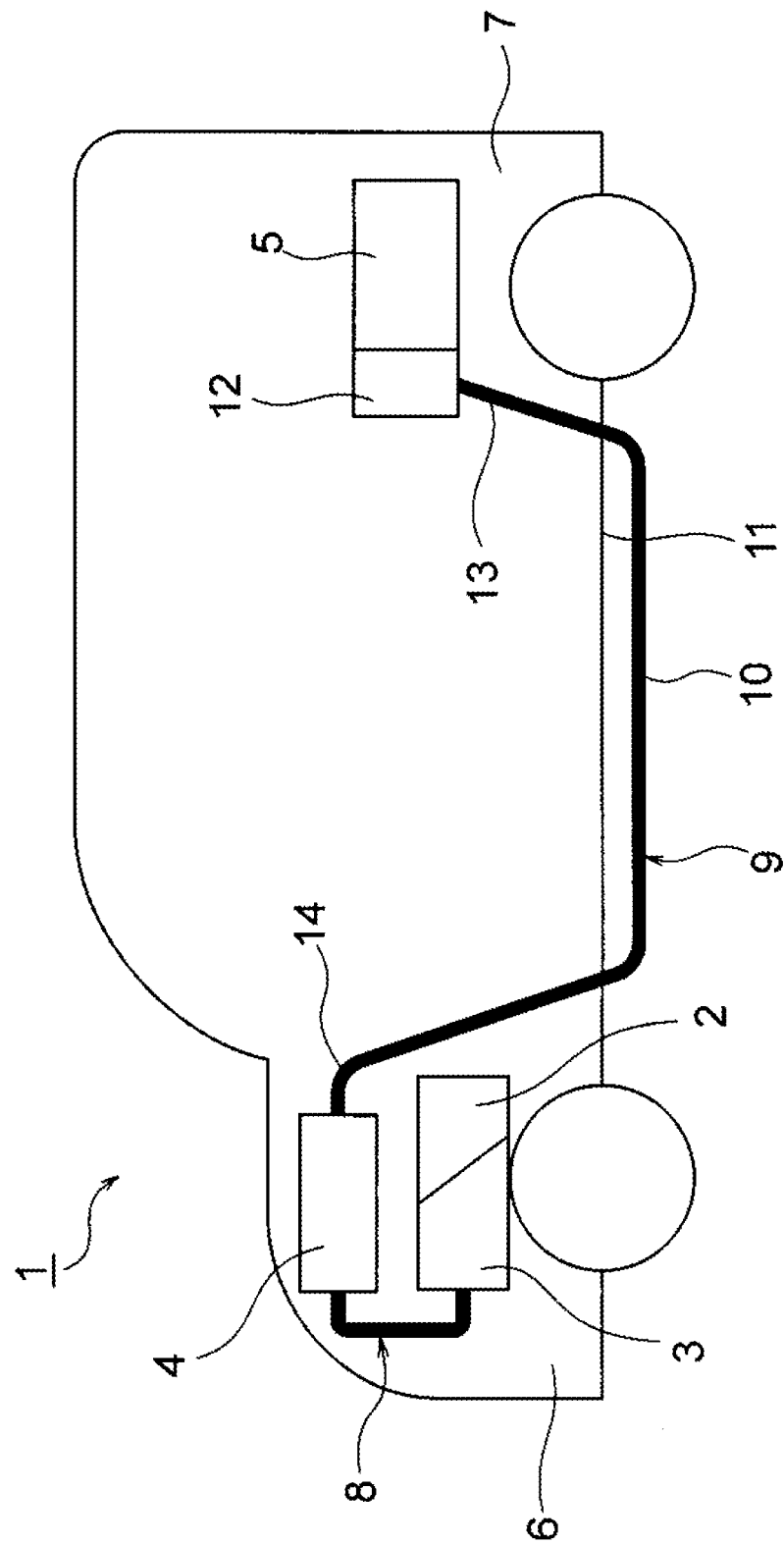
FIG. 1 is a schematic view illustrating an arrangement of a wire harness.
Figure 2:
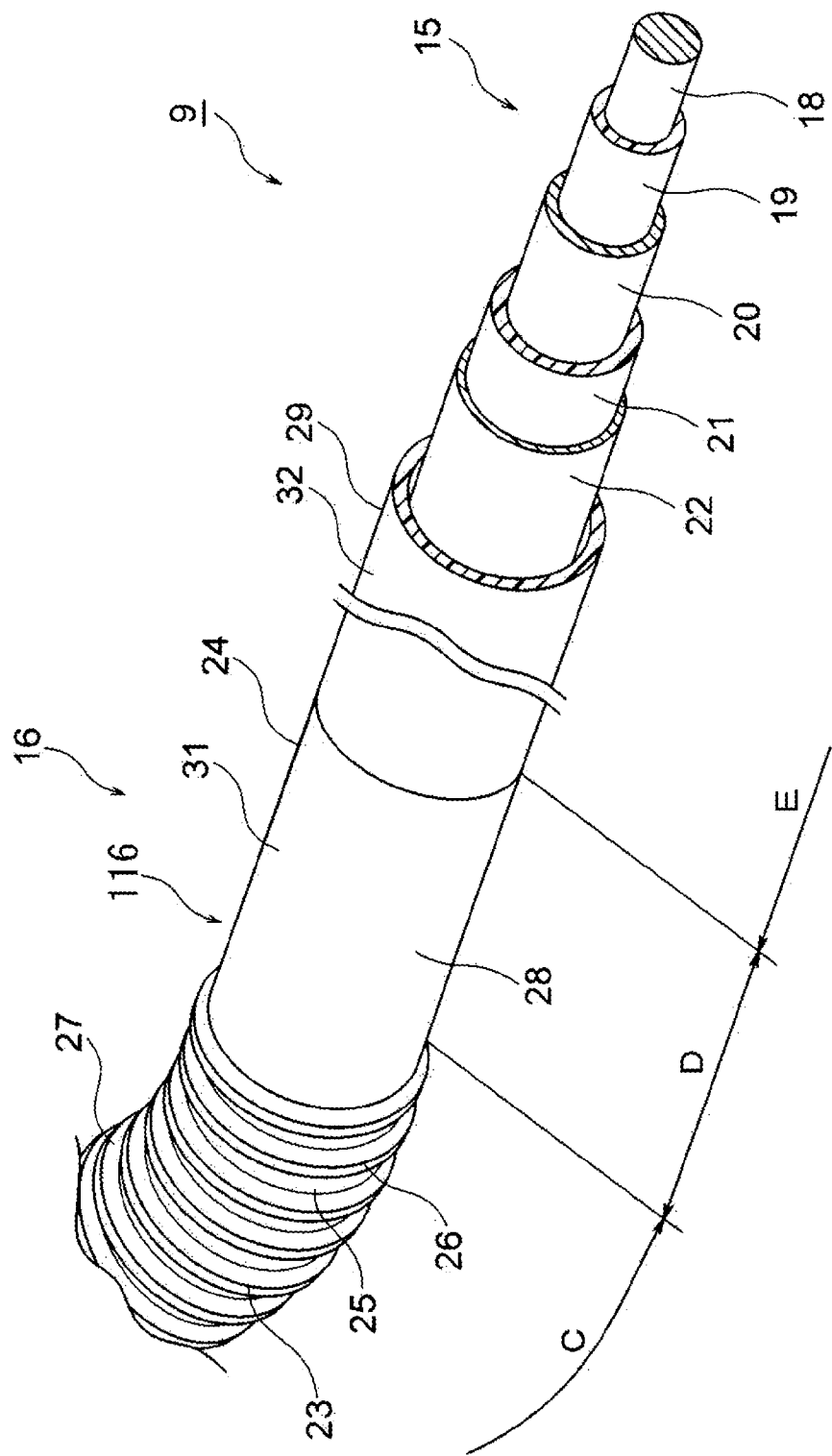
FIG. 2 is a view illustrating a configuration of the wire harness.
Figures 3A, 3B:
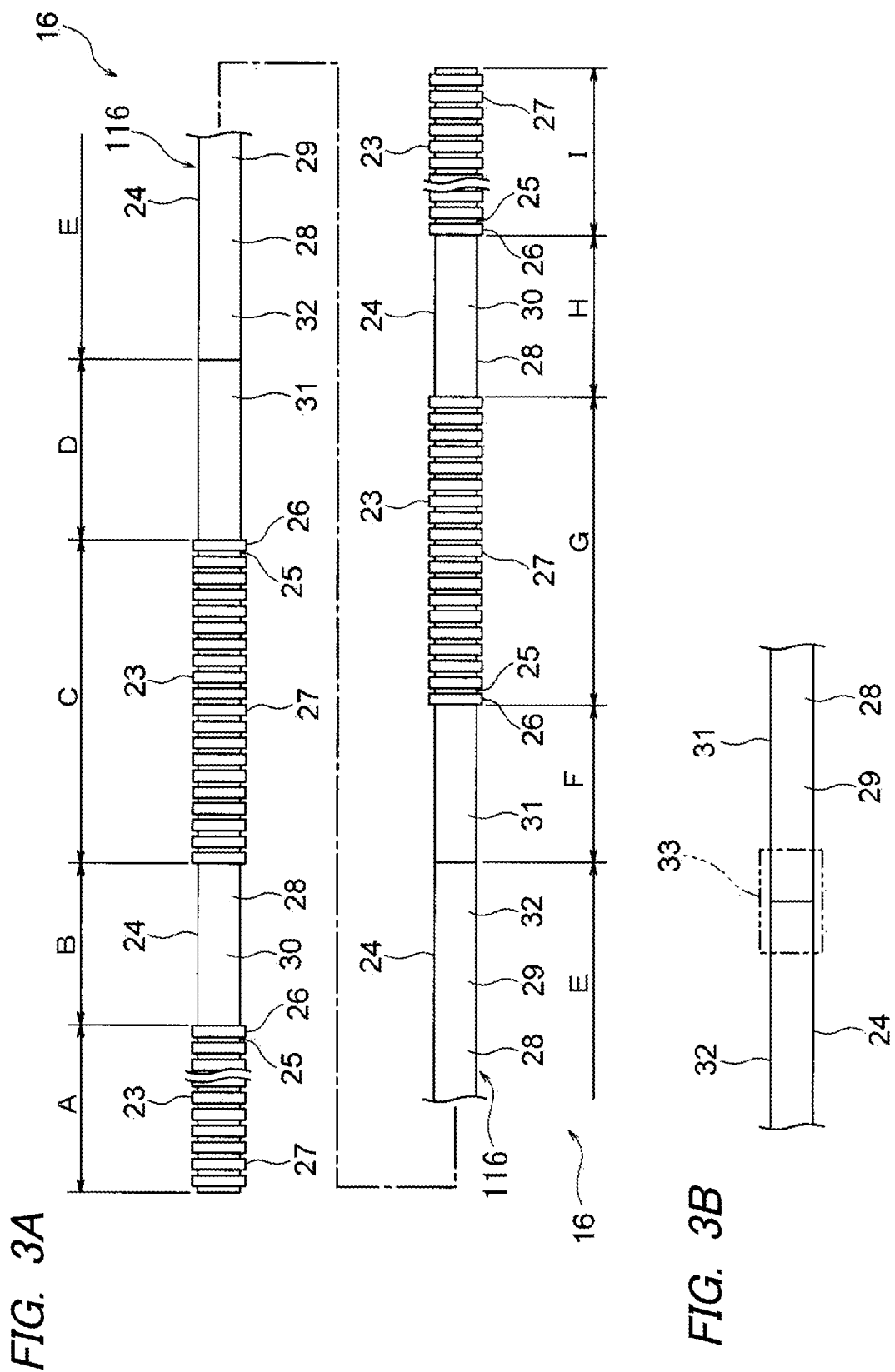
FIGS. 3A and 3B are views illustrating a configuration of an exterior member according to a first embodiment.
Figure 4:
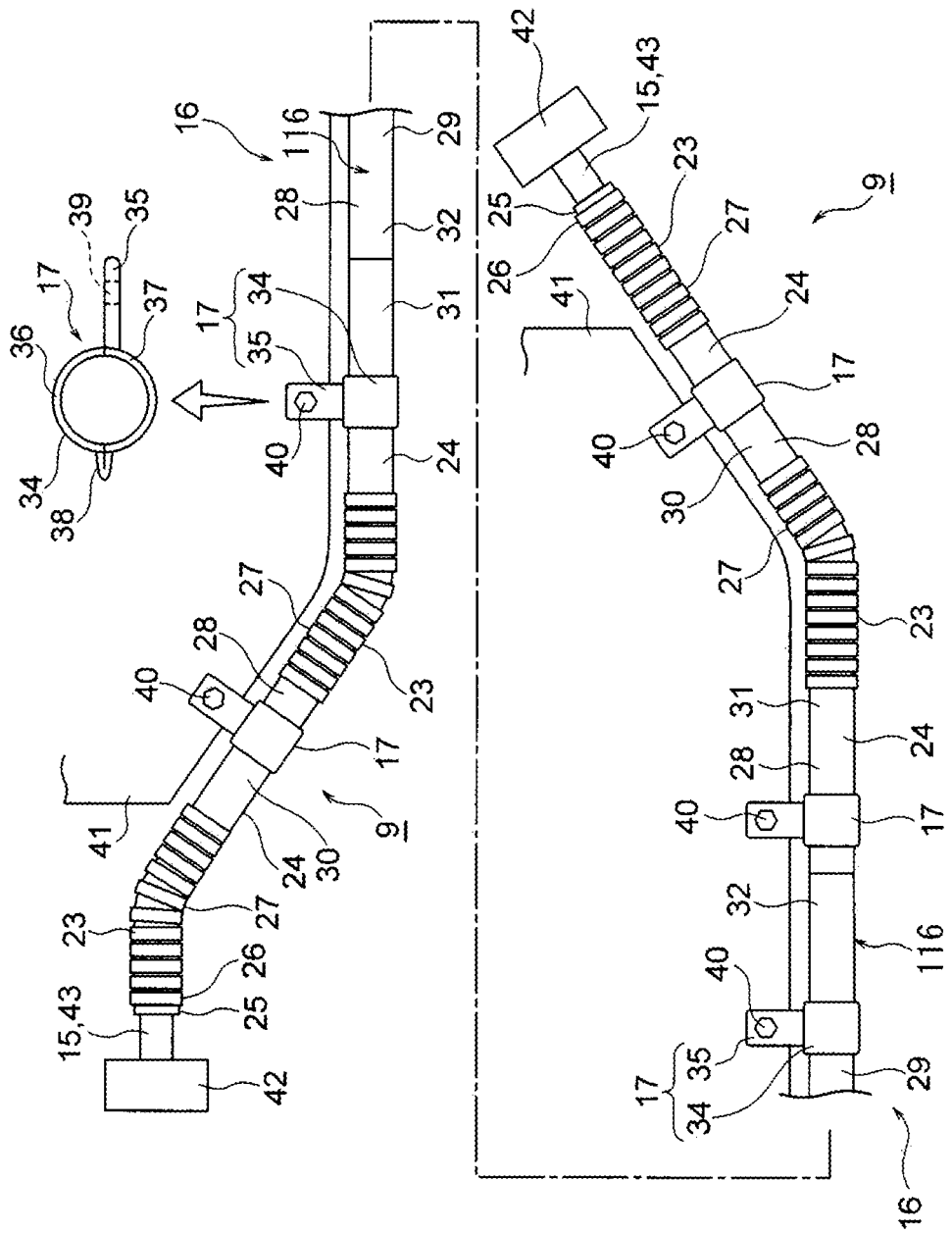
FIG. 4 is a view illustrating a fixed state of the wire harness.

A first embodiment of a wire harness exterior member according to the present invention will be described below referring to FIGS. 1 to 4(b). FIG. 1 is a schematic view illustrating an arrangement of a wire harness. Furthermore, FIG. 2 is a view illustrating a configuration of the wire harness, FIGS. 3A and 3B are views illustrating a configuration of the exterior member, and FIG. 4 is a view illustrating a fixed state of the wire harness.

In the first embodiment, a wire harness including the wire harness exterior member according to the first embodiment and arranged in a hybrid car (an electric car or a general automobile may be used) is taken as an example and described.

In FIG. 1, reference numeral 1 designates a hybrid car. The hybrid car 1 is a vehicle driven by two mixed drive power sources, i.e., an engine 2 and a motor unit 3. Electric power is supplied to the motor unit 3 from a battery 5 (that is, a battery pack) via an inverter unit 4. In this example, the engine 2, the motor unit 3 and the inverter unit 4 are mounted in the engine room 6 positioned close to the front wheels. In addition, the battery 5 is mounted in the vehicle rear portion 7 close to the rear wheels. However, the battery 5 may be mounted inside the passenger compartment provided behind the engine room 6.

The motor unit 3 and the inverter unit 4 are electrically connected to each other via a high-voltage wire harness 8. The battery 5 and the inverter unit 4 are also electrically connected to each other via a high-voltage wire harness 9. The intermediate portion 10 of the wire harness 9 is arranged along the vehicle underfloor portion 11. Furthermore, the wire harness 9 is arranged nearly parallel to the vehicle underfloor portion 11. The vehicle underfloor portion 11 is a known body, that is, the so-called panel member, and is provided with through holes (not shown) at predetermined positions. The wire harness 9 is inserted into the through holes.

The wire harness 9 is electrically connected to the battery 5 via a junction block 12 provided on the battery 5. The rear end portion 13 of the wire harness 9 is electrically connected to the junction block 12 using a known method. The front end portion 14 of the wire harness 9 is electrically connected to the inverter unit 4 using a known method.

The motor unit 3 has a motor (not shown) and a generator (not shown). Furthermore, the inverter unit 4 has an inverter (not shown) and a converter (not shown). The motor unit 3 is formed as a motor assembly including a shield case (not shown). Moreover, the inverter unit 4 is also formed as an inverter assembly including a shield case (not shown). The battery 5 is a Ni-MH or Li-ion battery and is modularized. However, for example, a power storage device, such as a capacitor, can also be used. The battery 5 is not particularly limited, provided that it can be used for the hybrid car 1 and an electric car.

First, the configuration and structure of the wire harness 9 will be described. The wire harness 9 is a member for high voltage to electrically connect the inverter unit 4 to the battery 5 as described above, and includes a high-voltage coaxial composite conducting path 15 (that is, a conducting path) and an exterior member 16 (that is, a wire harness exterior member) as shown in FIG. 2. The wire harness 9 having this configuration is fixed to the vehicle underfloor portion 11 or the like via clamps 17 (see FIG. 4) that are attached later to the exterior member 16.

The high-voltage coaxial composite conducting path 15, a single path, has a plus circuit and a minus circuit. In other words, the high-voltage coaxial composite conducting path 15 has two circuits. More specifically, the high-voltage coaxial composite conducting path 15 has a first conducting path 18 having a circular cross section and positioned at the center of the high-voltage coaxial composite conducting path 15 and a first insulator 19 covering the outer circumference of the first conducting path 18 with a predetermined thickness. Furthermore, the high-voltage coaxial composite conducting path 15 has a second conducting path 20 provided outside the first insulator 19 and a second insulator 21 covering the outer circumference of the second conducting path 20 with a predetermined thickness. Moreover, the high-voltage coaxial composite conducting path 15 further has a cylindrical electromagnetic shielding member 22 tightly making contact with the outer face of the second insulator 21. The high-voltage coaxial composite conducting path 15 may further include a sheath covering the outer circumference of the electromagnetic shielding member 22 with a predetermined thickness.

The electromagnetic shielding member 22 is made of a known braid, a known metal foil, etc. and may be disposed as described below, instead of being disposed so as to be included in the configuration of the high-voltage coaxial composite conducting path 15 as described above. In other words, the electromagnetic shielding member 22 may be disposed in a slightly loose state with respect to the second insulator 21.

The electromagnetic shielding member 22 may be formed into a cylindrical shape and may tightly make contact with the outer face of the second insulator 21, or may be formed into a tape shape or a sheet shape and may be wound around the outer face of the second insulator 21 so as to tightly make contact therewith.

The conducting path may be, other than the high-voltage coaxial composite conducting path 15 described above, a known high-voltage electric wire including a conductor and an insulator, a shielded wire, a cabtire cable, a bus bar provided with an insulator. The number of the conducting paths may be one or more.

In the first embodiment, the high-voltage coaxial composite conducting path 15 is available in two systems; however, without being limited to this, three systems, . . . , n systems may also be used. In other words, n systems are obtained by increasing circuits to the outside so that a coaxial single configuration is formed.

In FIGS. 2 and 3A, the exterior member 16 has a body portion 116 accommodating and protecting (that is, covering) the high-voltage coaxial composite conducting path 15. The body portion 116 has a flexible tube portion 23 and an inflexible tube portion 24 and is resin-molded so that the whole shape has a nearly straight shape. In the case of the first embodiment, the flexible tube portion 23 and the inflexible tube portion 24 may be read as a corrugated tube portion and a straight tube portion (that is, a non-corrugated tube portion). The body portion 116 is resin-molded into a pipe shape (that is, a pipe body shape).

The flexible tube portion 23 is a flexible portion to be bent during the shipping or the routing of the wire harness 9, and the inflexible tube portion 24 continues from the flexible tube portion 23. The inflexible tube portion 24 is provided as an inflexible portion (in other words, a portion that is difficult to bend). The flexible tube portion 23 and the inflexible tube portion 24 are respectively disposed at positions and formed to lengths corresponding to the shapes obtained when the pipe sections are mounted on the vehicle. The flexible tube portion 23 and the inflexible tube portion 24 are formed so that the cross-sectional shapes thereof coincide with each other. In other words, in the case that the flexible tube portion 23 has a circular cross section, the inflexible tube portion 24 is formed so as to have a circular cross section; and in the case that the flexible tube portion 23 has a nearly rectangular cross section, the inflexible tube portion 24 is formed so as to have a nearly rectangular cross section.

With respect to the flexible tube portion 23 and the inflexible tube portion 24, in the first embodiment, the respective pipe sections are provided in plural numbers, but the numbers are not limited particularly. In other words, one flexible tube portion 23 may be formed and one inflexible tube portion 24 may be formed on each side thereof. Alternatively, one inflexible tube portion 24 may be formed and one flexible tube portion 23 may be formed on each side thereof.

The flexible tube portion 23 is formed to have a shape of a corrugated tube having, continuously along the longitudinal direction thereof, a plurality of depressions 25 and a plurality of protrusions 26 formed around the circumference of the outer face thereof. The length of the flexible tube portion 23 is set depending on the bending range. The flexible tube portion 23 is formed at a portion that is pliable (that is, flexible) and bendable. In the first embodiment, the flexible tube portion 23 is formed at portions similar to those where known corrugated tubes are formed. The shape of the flexible tube portion 23 is not limited to the shape of the corrugated tube in so far as it is flexible.

As described below, the flexible tube portion 23 is also resin-molded as a resin characterized portion 27 (see FIG. 3A). In other words, in the first embodiment, the resin characterized portion 27 is provided as a portion corresponding to the flexible tube portion 23.

Since the flexible tube portion 23 has a portion having a shape similar to that of the corrugated tube as described above, the exterior member 16 can be regarded as "a corrugated tube" or "a partially corrugated tube".

The exterior member 16 (the body portion 116) is formed into a shape with no slits provided (in other words, having no longitudinal openings) in the pipe axis direction thereof (that is, in the longitudinal direction). The reason why no slits are provided is to secure rigidity and strength. In addition, the reason is to prevent moisture from intruding and to improve waterproofing performance. Furthermore, for example, the reason is to make the high-voltage coaxial composite conducting path 15 hardly protrude from the bent portion of the exterior member 16.

The inflexible tube portion 24 has an inflexible tube body 28. This inflexible tube body 28 is formed as a portion that is not bent during the shipping or the routing described above (the portion that is not bent means a portion not positively provided with flexibility). The inflexible tube body 28 is formed into a straight tube shape having a circular cross section. The shape of the inflexible tube body 28 is not limited to the circular cross section, but may be an elliptical shape, an oval shape or a nearly rectangular shape. Since the inflexible tube body 28 has a straight tube shape, the inflexible tube portion 24 can also be regarded as a "straight tube portion" or a "straight section".

The inflexible tube body 28 is formed thin so as to have a necessary minimum strength. A portion for enhancing heat dissipation and rigidity, a portion for ensuring chipping resistance, etc. may be formed on the inflexible tube body 28 as necessary.

The body portion 116 of the exterior member 16 has an underfloor inflexible tube portion 29 that is arranged to the vehicle underfloor portion 11 (see FIG. 1) as the inflexible tube portion 24. Since the underfloor inflexible tube portion 29 is arranged to the vehicle underfloor portion 11 (for example, arranged along a reinforcement member), the section is formed into a longitudinal shape.

The inflexible tube portion 24 is also resin-molded as resin characterized portions 30, 31 and 32 (see FIG. 3A) as described later. In other words, the resin characterized portions 30, 31 and 32 are used as portions corresponding to the inflexible tube portions 24.

The resin characterized portions 30, 31 and 32 of the inflexible tube portion 24 and the resin characterized portion 27 of the flexible tube portion 23 will be described below.

In FIG. 3A, the body portion 116 of the exterior member 16 is resin-molded after a plurality of sections A to I have been set in the tubular body longitudinal direction thereof. In the exterior member 16, the plurality of sections A to I having been set correspond to portions to which resin material characteristics, such as chemical resistance, abrasion resistance and heat resistance, are desired to be given. Furthermore, the plurality of sections A to I having been set correspond to portions to which flexibility is desired to be given and portions to which rigidity is given.

In the first embodiment, the sections A, C, G, I are portions corresponding to the flexible tube portion 23 and are formed as the resin characterized portions 27. Furthermore, the sections B, D, E, F and H are portions corresponding to the inflexible tube portions 24 and are formed as the resin characterized portions 30, 31 and 32. The sections D, E and F are portions corresponding to the underfloor inflexible tube portions 29 of the inflexible tube portion 24, wherein the sections D and F are molded as the resin characterized portions 31, and the section E is molded as the resin characterized portion 32. As described above, the sections A to I are set, resin materials having characteristics corresponding to the sections are selected, and the resin characterized portions 27, 30, 31, 32 are molded.

In the first embodiment, the sections A to I may be set at the flexible tube portions 23 and the inflexible tube portions 24. However, the sections may be set only at the inflexible tube portions 24 or may be set only at the underfloor inflexible tube portions 29.

In the underfloor inflexible tube portion 29, the resin characterized portions 31 and 32 are molded so as to extend continuously in a watertight manner. In order that the resin characterized portions extend continuously, for example, two-color molding is taken as a suitable example. Furthermore, as shown in FIG. 3B, it is effective to perform the continuous extension by attaching a joint member 33 later. It is also effective to reinforce the continuously extended portion (that is, the connection portion) by using a reinforcement component or the like, although not shown particularly. In addition to the above, it is effective to continuously extend, for example, the resin characterized portions 31 and 32, by fusing, welding, taping, etc.

With respect to the resin materials for molding the resin characterized portions 27, 30, 31, 32, the resin materials refer to thermoplastics. Thermoplastics are classified into general purpose resins, engineering plastics and super engineering plastics.

Polyethylene (PE), polypropylene (PP), ABS resin, polyethylene terephthalate (PET), etc. are taken as examples of general purpose resins. In addition, polyamide (PA), polyacetal (POM), polycarbonate (PC), polybutylene terephthalate (PBT), etc. are taken as examples of engineering plastics. Furthermore, polyphenylene sulfide (PPS), etc. are taken as examples of super engineering plastics.

Polyethylene (PE) is a resin material excellent in chemical resistance, electrical insulation and water resistance. Polypropylene (PP) is a resin material excellent in chemical resistance, mechanical strength, heat resistance. ABS resin is a resin material excellent in heat resistance, abrasion resistance, dimensional stability and electric characteristics. Polyethylene terephthalate (PET) is a resin material excellent in sliding characteristics, mechanical characteristics, electric characteristics and chemical resistance.

Polyamide (PA) is a resin material excellent in mechanical strength, abrasion resistance, chemical resistance and heat resistance. Polyacetal (POM) is a resin material excellent in dimensional stability, rigidity, abrasion resistance and electrical insulation. Polycarbonate (PC) is a resin material excellent in impact resistance, dimensional stability, electric characteristics and cold resistance. Polybutylene terephthalate (PBT) is a resin material excellent in sliding characteristics, impact resistance and electrical insulation.

Polyphenylene sulfide (PPS) is a resin material excellent in heat resistance, mechanical strength, chemical resistance, flame retardance and dimensional stability.

Since the exterior member 16 is molded so as to have the plurality of resin characterized portions 27, 30, 31, 32, the exterior member 16 can utilize the characteristics of the above-mentioned resin materials at the respective portions thereof.

In FIG. 4, the clamp 17 is a component to be attached later and has a rigid attaching section 34 that is formed in accordance with the external shape of the body portion 116 (the inflexible tube portion 24) of the exterior member 16 and a fixing portion 35 having a cantilever shape and continuously extending to the rigid attaching section 34. The rigid attaching section 34 has tube attachments 36 and 37, each having a halved shape, and a hinge 38 for connecting these tube attachments 36 and 37. The rigid attaching section 34 is formed as a portion having rigidity and being hardly bent. Fitting sections, not shown, for making these into a fit state are formed in the tube attachments 36 and 37.

A bolt insertion hole 39 is formed in the fixing portion 35 so as to pass therethrough. The wire harness 9 is fixed to a fixing counterpart 41, such as the vehicle underfloor portion 11, via bolts 40 inserted through the bolt insertion holes 39. The shape of the fixing counterpart 41 shown in the figure is one example. Once the wire harness 9 is fixed to the fixing counterpart 41, the routing shown in FIG. 4 is completed.

In addition to the above-mentioned clamp 17, a clip, a grommet, a protector, etc. are taken as examples of components to be attached later.

In FIG. 4, the wire harness 9 is produced by inserting the high-voltage coaxial composite conducting path 15 into the body portion 116 of the exterior member 16 and then by mounting the clamps 17 at predetermined positions of the exterior member 16. Furthermore, the wire harness 9 is produced by providing a known shield connector 42 at each terminal position of the wire harness 9.

The shield connector 42 on one side is a shield connector on the side of the inverter, and the shield connector 42 on the other side is a shield connector on the side of the battery. The shield connector 42 is connected to the end 43 of the high-voltage coaxial composite conducting path 15 extended from the exterior member 16.

As described above referring to FIGS. 1 to 4(b), the wire harness 9 includes the high-voltage coaxial composite conducting path 15 and the exterior member 16 for covering the high-voltage coaxial composite conducting path 15. The exterior member 16 has the tubular body portion 116 for covering the high-voltage coaxial composite conducting path 15. The plurality of sections A to I are set in the tubular body longitudinal direction of the body portion 116, and the body portion 116 has resin characterized portions 27, 30, 31, 32 molded using resin materials having characteristics adapted to the specified sections A to I. For this reason, the exterior member 16 meeting requirements can be provided instead of molding the whole using an expensive resin material having numerous characteristics. In other words, the cost can be reduced in comparison with conventional external members.

Second Embodiment

Figure 5:
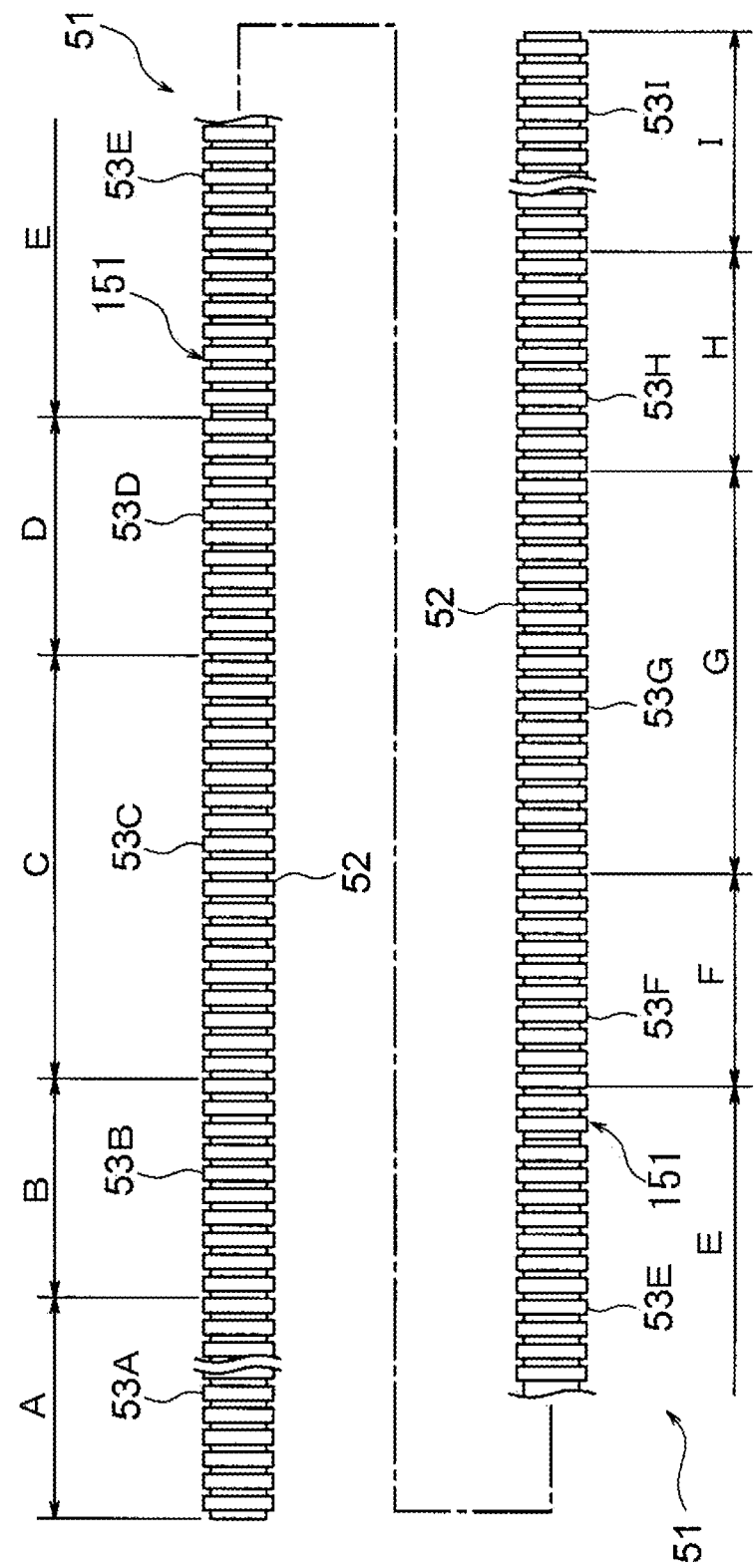
FIG. 5 is a view illustrating a configuration of an exterior member according to a second embodiment.

A second embodiment of the wire harness exterior member according to the present invention will be described below referring to FIG. 5. FIG. 5 is a view illustrating a configuration of the exterior member according to the second embodiment. Basically the same components as those used in the above-mentioned first embodiment are designated by the same reference numerals and their detailed descriptions are omitted. Furthermore, the exterior member according to the second embodiment is included in a wire harness that is arranged similarly as in the wire harness 9 according to the first embodiment shown in FIG. 1.

In FIG. 5, the body portion 151 of an exterior member 51 is entirely formed to have a shape of a corrugated tube. In other words, the body portion 151 is entirely formed as a corrugated tube portion 52. Furthermore, the body portion 151 is resin-molded after a plurality of sections A to I have been set in the tubular body longitudinal direction thereof. In the exterior member 51, the plurality of sections A to I having been set correspond to portions to which resin material characteristics, such as chemical resistance, abrasion resistance and heat resistance, are desired to be given. In the exterior member 51, a plurality of resin characterized portions 53A to 53I are molded using resin materials having characteristics adapted to the specified sections A to 1.

Since the exterior member 51 according to the second embodiment is not molded entirely using an expensive resin material having numerous characteristics, the cost can be reduced in comparison with conventional external members.

In addition, since the exterior member 51 has the plurality of resin characterized portions 53A to 53I, the exterior member 51 can utilize the characteristics of the resin materials at the respective portions thereof.

Third Embodiment

Figure 6:
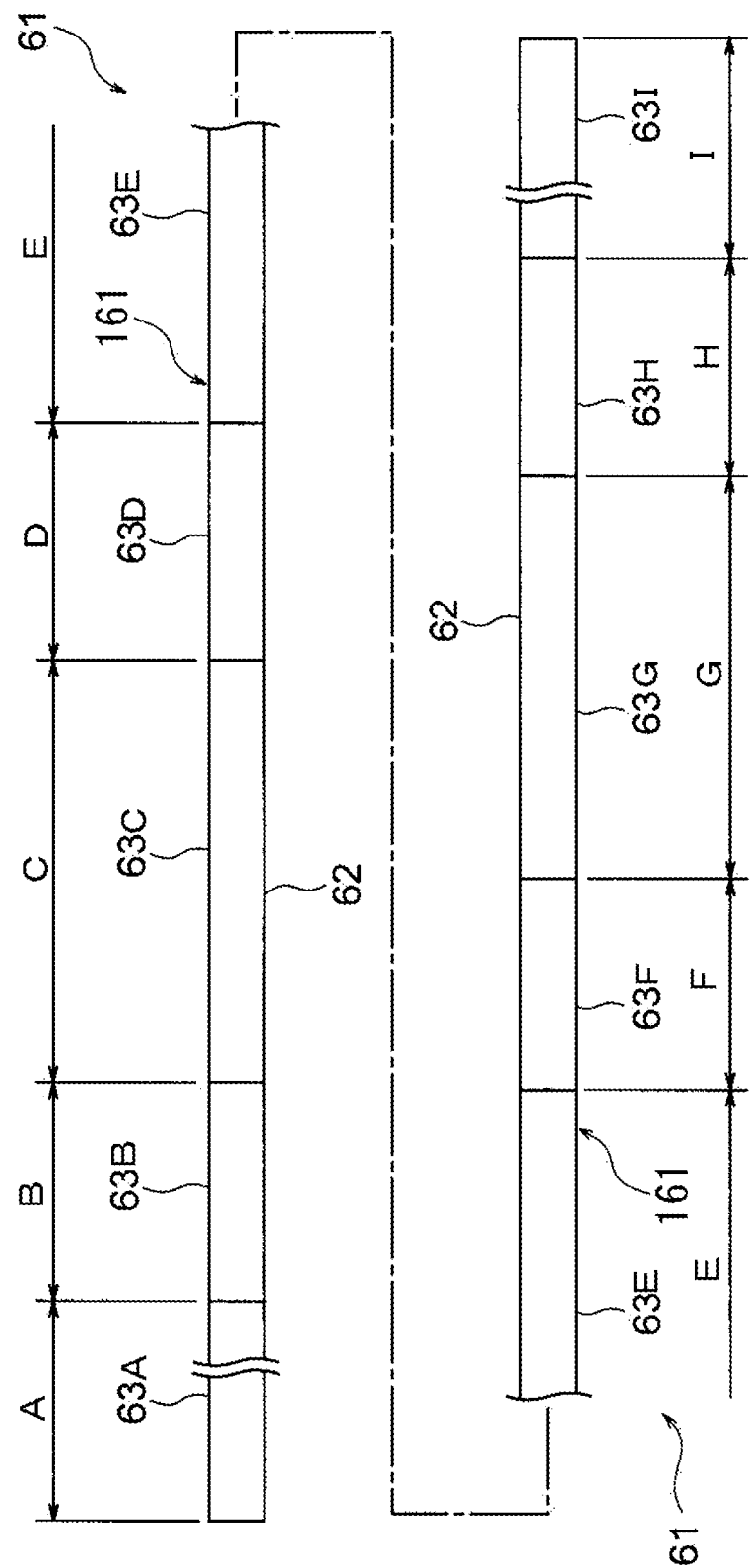
FIG. 6 is a view illustrating a configuration of an exterior member according to a third embodiment.

A third embodiment of the wire harness exterior member according to the present invention will be described below referring to FIG. 6. FIG. 6 is a view illustrating a configuration of the exterior member according to the third embodiment. Basically the same components as those used in the above-mentioned first embodiment are designated by the same reference numerals and their detailed descriptions are omitted. Furthermore, the exterior member according to the third embodiment is included in a wire harness that is arranged similarly as in the wire harness 9 according to the first embodiment shown in FIG. 1.

In FIG. 6, the body portion 161 of an exterior member 61 is entirely formed into a straight tube shape (i.e., a non-corrugated tube shape). In other words, the body portion 161 is entirely formed as a non-corrugated tube portion 62. Furthermore, the body portion 161 is resin-molded after a plurality of sections A to I have been set in the tubular body longitudinal direction thereof. In the exterior member 61, the plurality of sections A to I having been set correspond to portions to which resin material characteristics, such as chemical resistance, abrasion resistance and heat resistance, are desired to be given. Moreover, the plurality of sections A to I having been set correspond to portions desired to be bent or portions to which rigidity is desired to be given.

The sections A, C, G, I corresponding to the portions desired to be bent are set as portions that are bent by heating in accordance with the routing. In the exterior member 61, a plurality of resin characterized portions 63A to 63I are molded using resin materials having characteristics adapted to the specified sections A to 1.

Since the exterior member 61 according to the third embodiment is not molded entirely using an expensive resin material having numerous characteristics, the cost can be reduced in comparison with conventional external members.

In addition, since the exterior member 61 has the plurality of resin characterized portions 63A to 63I, the exterior member 61 can utilize the characteristics of the resin materials at the respective portions thereof.

The wire harness 9 and the exterior member 16 according to the embodiments are summarized as follows.

(1) An exterior member 16, 51, 61 (a wire harness exterior member) is made of resin, the exterior member having a tubular body portion 116, 151, 161 covering a high-voltage coaxial composite conducting path 15 (at least one conducting path), and at least a portion of the body portion 116, 151, 161 in the tubular body longitudinal direction thereof is arranged at a vehicle underfloor portion 11. The plurality of specified sections A to 1 are set along the tubular body longitudinal direction of the body portion 116, 151, 161, and the body portion 116, 151, 161 has, for each specified section, a resin characterized portion 27, 30, 31, 32, 53A to 53I, 63A to 63I molded using a resin material having characteristics adapted to the corresponding specified section A to 1.

(2) In the exterior member 16, 51, 61 (the wire harness exterior member), adjacent ones of the resin characterized portions 27, 30, 31, 32, 53A to 53I, 63A to 63I are provided continuously in a watertight manner.

(3) In the exterior member 16 (the wire harness exterior member), the body portion 116 includes the flexible tube portion 23 molded as an flexible portion and the inflexible tube portion 24 molded as an inflexible portion continuing from the flexible tube portion 23, and the resin characterized portions 27, 30, 31, 32 are provided in the inflexible tube portion 24, or in the flexible tube portion 23 and in the inflexible tube portion 24.

(4) In the exterior member 51, 61 (the wire harness exterior member), the body portion 151, 161 is configured as the corrugated tube portion 52 or the non-corrugated tube portion 62.

(5) In the exterior member 16 (the wire harness exterior member), the body portion 116 is configured as a combination of a corrugated tube portion and a non-corrugated tube portion, and the resin characterized portions 27, 30, 31, 32 are provided in the non-corrugated tube portion, or in the corrugated tube portion and in the non-corrugated tube portion.

(6) The wire harness 9 includes the exterior member 16, 51, 61 (the wire harness exterior member) described in any one of (1) to (5) described above, and the high-voltage coaxial composite conducting path 15 (at least one conducting path) covered by the exterior member 16, 51, 61.

In addition to the above, of course, the present invention can be implemented with various changes without changing the gist of the present invention.

What is claimed is:

1. A wire harness exterior member made of resin, the wire harness exterior member comprising:
    a tubular body portion covering at least one conducting path, at least a portion of the tubular body portion in a longitudinal direction of the tubular body portion being arranged at a vehicle underfloor portion,
    wherein the tubular body portion includes a plurality of specified sections along the longitudinal direction of the tubular body portion,
    wherein each of the specified sections is formed from a resin material according to a predetermined requirement for each of the specified sections, and
    wherein at least one of the plurality of specified sections is formed of a first resin material having different characteristics than a second resin material used for an other of the plurality of the specified sections based on the different predetermined requirement associated with different specified sections.

2. The wire harness exterior member according to claim 1, wherein the specified sections are continuously provided and each of the specified sections are connected in a watertight manner.

3. The wire harness exterior member according to claim 1, wherein the body portion comprises:
    a flexible tube portion and an inflexible tube portion attached to the flexible tube portion, wherein the specified sections are provided in the inflexible tube portion or in the flexible tube portion and in the inflexible tube portion.

4. The wire harness exterior member according to claim 1, wherein the body portion includes a corrugated tube or a non-corrugated tube.

5. The wire harness exterior member according to claim 1, wherein the body portion includes a combination of a corrugated tube portion and a non-corrugated tube portion, and
the specified sections are provided in the non-corrugated tube portion or in both the corrugated tube portion and the non-corrugated tube portion.

6. A wire harness comprising a wire harness exterior member, and at least one conducting path covered by the wire harness exterior member,
wherein the wire harness exterior member is made of resin, the wire harness exterior member comprising:
a tubular body portion covering the at least one conducting path, at least a portion of the tubular body portion in a longitudinal direction of the tubular body portion being arranged at a vehicle underfloor portion,
wherein a plurality of specified sections are set along the tubular body longitudinal direction of the body portion, and
wherein each of the specified sections is formed from a resin material according to a predetermined requirement for each of the specified sections, and
wherein at least one of the plurality of specified sections is formed of a first resin material having different characteristics than a second resin material used for an other of the plurality of the specified sections based on the different predetermined requirement associated with different specified sections.

* * * * *